(12) United States Patent
Jamieson et al.

(10) Patent No.: US 7,039,687 B1
(45) Date of Patent: May 2, 2006

(54) MULTI-PROTOCOL LABEL SWITCHING VIRTUAL PRIVATE NETWORKS

(75) Inventors: Dwight D. Jamieson, Ottawa (CA); Bilel N. Jamoussi, Ottawa (CA); Paul J. Beaubien, Ottawa (CA); Gregory V. Wright, Ottawa (CA)

(73) Assignee: Nortel Networks Limited, St. Laurent (CA)

( * ) Notice: Subject to any disclaimer, the term of this patent is extended or adjusted under 35 U.S.C. 154(b) by 0 days.

(21) Appl. No.: 09/131,051

(22) Filed: Aug. 7, 1998

(51) Int. Cl.
*G06F 15/173* (2006.01)

(52) U.S. Cl. ..................... 709/220; 370/392

(58) Field of Classification Search ........ 709/220–222, 709/218, 227; 370/401, 404, 403, 402, 392, 370/400
See application file for complete search history.

(56) References Cited

U.S. PATENT DOCUMENTS

| | | | | |
|---|---|---|---|---|
| 5,423,002 A | * | 6/1995 | Hart | 709/249 |
| 5,583,862 A | * | 12/1996 | Callon | 370/397 |
| 5,930,257 A | * | 7/1999 | Smith et al. | 370/401 |
| 5,963,556 A | * | 10/1999 | Varghese et al. | 370/401 |
| 5,999,536 A | * | 12/1999 | Kawafuji et al. | 370/401 |
| 6,069,889 A | * | 5/2000 | Feldman et al. | 370/351 |
| 6,079,020 A | * | 6/2000 | Liu | 713/201 |
| 6,339,595 B1 | * | 1/2002 | Rekhter et al. | 370/392 |
| 6,374,303 B1 | * | 4/2002 | Armitage et al. | 709/242 |

OTHER PUBLICATIONS

Viswanathan et al. "Evolution of Multiprotocol Label Switching," IEEE Communication Magazine, May 1998 pp. 165-173.*
U.S. Appl. No. 09/131,190, filed Aug. 7, 1998.

* cited by examiner

*Primary Examiner*—Dung Dinh
(74) *Attorney, Agent, or Firm*—Mintz, Levin, Cohn, Ferris, Glovsky et al

(57) ABSTRACT

A virtual private network enables private communications over a shared MPLS network between two or more private networks. The virtual private networks include a first router connected to the shared MPLS network and configured to dynamically distribute first router VPN information across the shared MPLS network. The first router VPN information includes a VPN identifier which is assigned to the first router. The VPN also includes a second router connected to the shared MPLS network and and configured to dynamically distribute second router VPN information across the shared MPLS network. The second router VPN information includes a VPN identifier which is assigned to the second router and which is identical to the VPN identifier assigned to the first router. The first and second routers are also configured to establish label switched paths therebetween. A method of automatically configuring virtual private networks over a shared MPLS network includes creating a link between a private network router and a shared network router. It also includes assigning a VPN identifier to the shared network router, assigning the same VPN identifier to at least one other shared network router, determining all shared network routers which are assigned the same VPN identifier, and creating at least two label switched paths between the shared network router and the other shared network routers.

16 Claims, 3 Drawing Sheets

MULTI-PROTOCOL LABEL SWITCHING VIRTUAL PRIVATE NETWORKS

FIELD OF THE INVENTION

The invention relates generally to the field of virtual private networks and more particularly, to distribution of private network information over shared network infrastructure in the Multi-Protocol Label Switching domain.

BACKGROUND OF THE INVENTION

With the growing popularity of the Internet and networks in general, there is a trend towards centralized network services and centralized network service providers. To be profitable, however, network service providers need to constantly maintain and if possible enlarge their customer base and their profits. Since leased line services are coming under increased competition, profit margins have been decreasing for these providers. Thus, an increased number of providers are trying to attract small and medium sized businesses by providing centralized network management.

Network providers are offering Virtual Private Networks (VPNs) to interconnect various customer sites that are geographically dispersed. VPNs are of great interest to both providers and to their customers because they offer privacy and cost efficiency through network infrastructure sharing. There has been difficulty providing this service, however, due to address conflicts, security problems, scalability issues and performance problems. Historical independent network development has resulted in conflicting and overlapping address space between the individual networks and the management networks.

Various VPN models have been proposed with various degrees of security, privacy, scalability, ease of deployment and manageability. For example, some providers have attempted to solve the problems by using encapsulating techniques, such as internet protocol (IP) tunneling, to separate network traffic from unrelated networks. Currently, IP tunnels are point to point links established between routers which are statically configured by a network operator. This method, however, suffers from many of the same problems discussed above. Inter-network security can not be guaranteed in IP tunneling as it relies upon customer premise equipment to be correctly configured. Further, performance can be a problem since routing disturbances caused by one customer may affect the routing performance of another customer's network.

Accordingly there exists the need for a system which allows the implementation of separate virtual private networks over common infrastructure while providing security and sufficient performance to each network.

The need also exists for such a device which automatically configures the virtual private networks.

The need further exists for such a system which allows for communicating private traffic through a shared network.

It is accordingly an object of the present invention to provide a system which allows the implementation of separate virtual private networks over common infrastructure while providing security and sufficient performance to each network.

It is another object of the invention to provide such a system which employs Multi-Protocol Label Switching.

It is another object of the invention to provide such a system which automatically configures the virtual private networks.

It is another object of the invention to provide such a system which allows for communication of private traffic through a shared network.

It is another object of the present invention to provide such a system which allows the Virtual Private Network to appear as a local area network like broadcast media.

These and other objects of the invention will become apparent to those skilled in the art from the following description thereof.

SUMMARY OF THE INVENTION

It has now been discovered that these and other objects may be accomplished by the present virtual private networks which enables private communications over a shared Multi-Protocol Label Switching (MPLS) network, between at least two private networks. The present invention includes a first router connected to the shared MPLS network and configured to dynamically distribute first router VPN information across the shared MPLS network. The first router VPN information includes a VPN identifier which is assigned to the first router. The VPN also includes a second router connected to the shared MPLS network and configured to dynamically distribute second router VPN information across the shared MPLS network. The second router VPN information includes a VPN identifier which is assigned to the second router and which is identical to the VPN identifier assigned to the first router. The first and second routers are also configured to establish label switched paths therebetween.

In an embodiment of the invention, the virtual private network includes first router means connected to the shared MPLS network for dynamically distributing first router means VPN information across the shared MPLS network. The first router means VPN information includes a VPN identifier which is assigned to the first router means. The invention also includes a second router means connected to the shared MPLS network for dynamically distributing second router means VPN information across the shared MPLS network. The second router means VPN information includes a VPN identifier which is assigned to the second router and which is identical to the VPN identifier assigned to the first router means. The first and second router means are also configured to establish a multiple label switched paths therebetween.

In another embodiment, the invention includes a method of automatically configuring virtual private networks over a shared MPLS network includes creating a link between a private network router and a shared network router. It also includes assigning a VPN identifier to the shared network router, assigning the same VPN identifier to at least one other shared network router, determining all shared network routers which are assigned the same VPN identifier, and creating at least two label switched paths between the shared network router and the other shared network router(s).

The invention will next be described in connection with certain illustrated embodiments; however, it should be clear to those skilled in the art that various modifications, additions and subtractions can be made without departing from the spirit or scope of the claims.

BRIEF DESCRIPTION OF THE DRAWINGS

For a fuller understanding of the nature and objects of the invention, reference should be made to the following detailed description and accompanying drawings, in which.

DETAILED DESCRIPTION OF THE INVENTION

A Virtual Private Network (VPN) is a group of individual networks logically connected through one or more shared networks. The present invention enables the automatic formation of VPNs by dynamically distributing VPN information throughout a shared Multi-Protocol Label Switched (MPLS) network. The proposed invention takes advantage of both network layer peering and packet switching, and the use of link layer circuits and per-stream switching.

Figure 1:
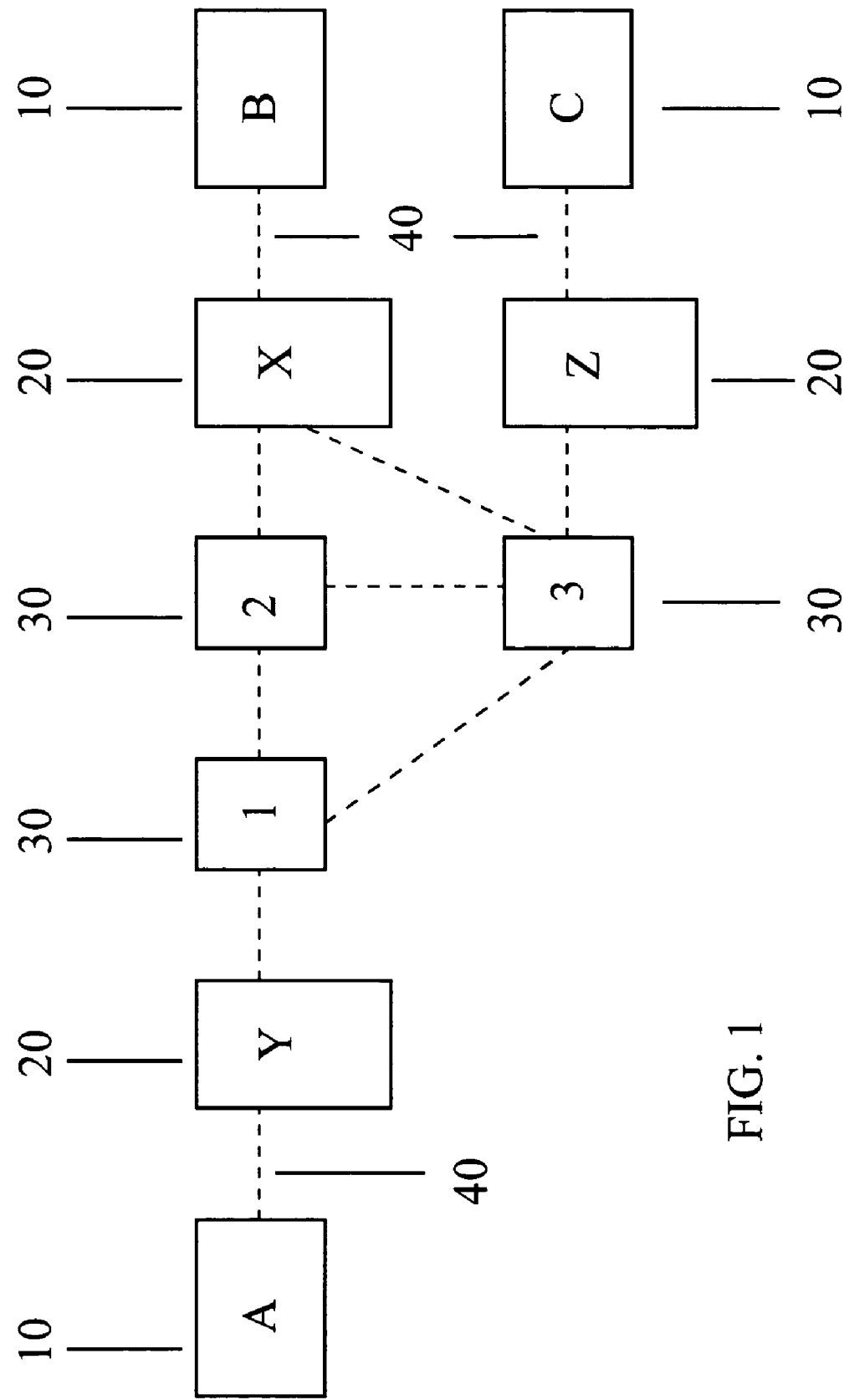
FIG. 1 depicts a block diagram of the preferred embodiment of a virtual private network in accordance with the invention.

FIG. 1. illustrates the building blocks of the MPLS VPN architecture of the present invention. Although only one VPN is shown, it will be apparent to those skilled in the art that multiple VPNs may also operate over the same shared network. Further, while the VPN has been illustrated as including three connected networks, it will be apparent that a VPN may also be formed by connecting two, four or more networks across the shared network.

The Private Network Adaptation Devices (PNAD) 10 are devices that run standards based layer 3 (OSPF, BGP, RIP, static routes, etc.) protocols to calculate and distribute reachability information about the customer network (not shown) attached thereto. They also run a Label Distribution Protocol (LDP) process for the purpose of establishing Label Switched Paths (LSP) between themselves and other members of the same VPN. The PNAD 10 may be a physical device that resides at either the customer's or carrier's premises. It also could be a logical device embedded in some other device, such as a Carrier Edge LSR (CEL) 20.

Access Control Link (ACL) 40 is a physical or logical link that connects the PNAD 10 to a CEL 20 for the purposes of LDP connectivity.

A CEL 20 is an LSR in the carrier domain participating in the carrier routing protocol. It may have one or more links connecting it to one or more PNADs 10. LDP peering is established over these links which is used to setup end to end (PNAD to PNAD) LSPs. CELs 20 may dynamically discover other CELs 20 supporting the same VPN and VPN subnets. LSPs are then established between those CELs 20 for the purpose of exchanging customer routing information and to carry datagrams across the shared network. The exchange of routing information across carrier network may be dynamic. This property eases network management and removes the need for static routing requiring operator intervention.

Two types of LSPs may be used to interconnect PNADs 10 of a VPN: Multipoint-to-point LSPs and Multipoint-to-multipoint LSPs. Each PNAD 10 has a multipoint-to-point LSP directed to it. It is used by all other PNADs 10 for unicast transmissions. All PNADs 10 of a VPN subnet may also be interconnected using a bi-directional, multipoint-to-multipoint LSP. This could be used for sending multicast datagrams. Because this LSP is bi-directional and multi-point-to-multi-point, one such LSP could service an entire VPN subnet, although it is conceivable that multiple LSPs of this type could be employed. Those skilled in the art will recognize that a multipoint-to-multipoint LSP is not strictly required, and that other techniques for multicasting datagrams are available. For example, the point-to-multi-point LSPs from each PNAD 10 in a VPN to all other PNADs 10 in the VPN could be employed for the same purpose. Multicast traffic may include Hello packets, Link State Advertisements (LSA), Address Resolution Protocol (ARP), etc.

The trigger for the creation of LSP(s) across the carrier network for the purpose of transporting VPN subnet data is the enabling of an ACL 40 between the CEL 20 and PNAD 10 for a given VPN subnet. Other triggers may also be set (i.e. reconfiguration, powerup, change in status of an entity on the PNAD 10, etc).

From the CEL 20 perspective, it has a point to point link of whatever media type that connects the two devices, over which it runs LDP. From the PNAD 10 side, the link is part of the VPN Subnet Interface (VSI) that connects the PNAD 10 to all other PNADs 10 of the same VPN subnet. One reason for including this link in the VSI is to conserve IP addresses. Only one IP address is required on the PNAD 10 for connectivity between the PNAD 10 and the CEL 20 and between the PNAD 10 and all other PNADs 10 of the same VPN subnet.

When the CEL 20 provisions the ACL 40, it is given a VPN Identifier. It is also given a VSI IP interface address and a prefix. This information can either be provisioned manually on the CEL 20 or learned dynamically via a protocol running over the ACL.

The VSI IP interface address together with the prefix identifies the VPN subnet to which the interface belongs. The interface address itself is used to distinguish between multiple ACLs 40 belonging to the same VPN subnet on the same CEL 20.

Once the new port has been configured, LDP is run between the CEL 20 and the PNAD 10 to establish an LSP between them. This LSP serves a dual purpose; it establishes a unicast LSP between the PNAD 10 and CEL 20 which can later be spliced into the multi-point-to-point LSP that connects all other PNADs 10 in the VPN subnet to this PNAD 10, and it serves as a signal that the PNAD 10 is enabled and ready to connect to other PNADs 10 over a given VSI.

The VPN information received from a CEL 20 contains a CEL IP address followed by a list of VPN ID/Interface Address/prefix triples. From this information a CEL 20 determines which, if any, LSP to establish. The CEL 20 determines if it has any VPNs in common with the list. If so, it checks to see if it has any VPN subnets in common. If there are, LSPs are triggered for each of the subnet interfaces.

Figure 3:
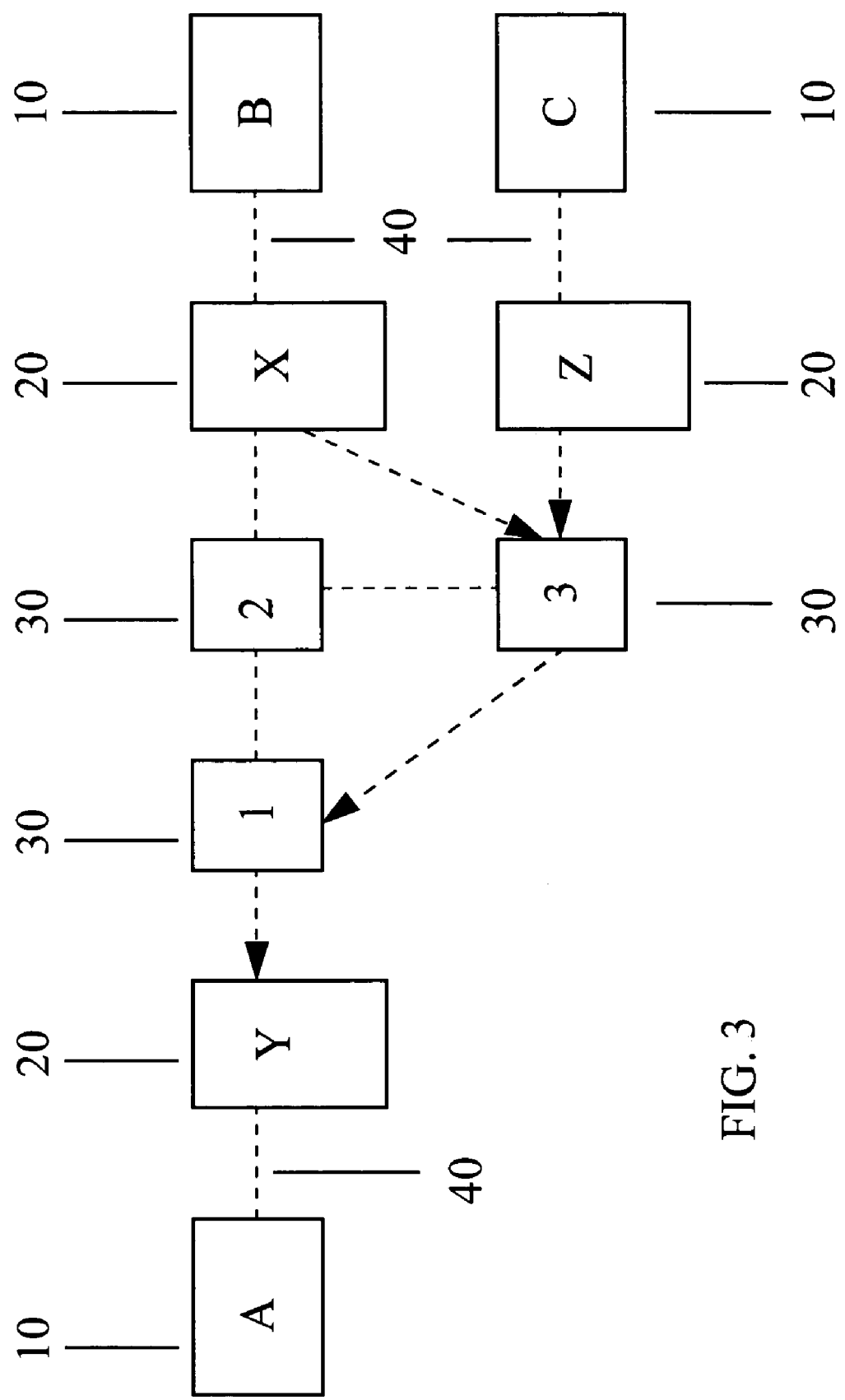
FIG. 3 depicts an example of creating a label switched path in the virtual private network depicted in FIG. 1.

In FIG. 3, the creation of LSPs is triggered when CEL X learns that CEL Y supports a common VPN and VPN subnet. An LSP is established from PNAD B to CEL X. LDP then continues to establish the LSP from X to Y. At Y, the LSP is completed by adding in the appropriate PNAD 10 to the LSP.

Downstream label allocation is used from the CELs 20 (leafs of the multi-point-to-point tree) to the Core LSRs 30. Core LSRs 30 may provide transport across the carrier network. They do not normally have links to PNADs 10 and they may run a layer 3 protocol and MPLS. Upstream on demand label allocation is used by the CELs 20 (root of the multi-point-to-multi-point tree) to its connected PNAD 20.

The LSP that is created is a unidirectional LSP that carries data from PNAD B to PNAD A. Within the carrier network, the LSP can be established along the best hop route or an explicitly provisioned route. If during the establishment of a best hop LSP, another LSP is encountered that goes to the same destination for the same VPN/VPN subnet, the LSPs can be merged. Those skilled in the art will recognize that this merger is a design choice and not a requirement of the system. For example, when Z tries to establish an LSP to Y, an existing LSP to Y for the given VPN/VPN subnet will be encountered on Core LSR 3 (30). The LSP will be merged at that point.

Each PNAD 10 may have a multicast LSP, an incoming LSP and N−1 outgoing LSPs where N is the number of PNADs 10 in the VPN subnet. The incoming label will be viewed by layer 3 as the MAC address for the interface. The outgoing labels will be viewed as destination MAC addresses for all of the peer routers on the VSI.

A modified version of Inverse ARP may be used to resolve the mapping of next hop IP address to outgoing MAC LSP. ARP, for this architecture, uses elements of both Inverse ARP and regular ARP. A modified ARP procedure is introduced to map PNAD IP addresses to MAC addresses. If the PNAD 10 is an LSR in its own right, label stacking can be used to label-switch datagrams in that PNAD 10 (instead of doing layer-3 forwarding). Some of the factors that influenced the design of this ARP mechanism are the local significance of labels/MAC addresses and multi-point to point connections. Non-Broadcast Multi-Access (NBMA) networks have locally significant MAC addresses but their full mesh of point to point links allows for a different ARP model (Inverse ARP).

Like Inverse ARP the trigger for an ARP request is when a MAC label is enabled (similar to a PVC up). When this happens, an ARP request is sent on the new label. This packet contains the label of the enabled LSP in the hardware address field and the VSI's IP address in the network address field. The purpose of this request is for the sending PNAD 10 to establish a mapping between the new label and the IP address of VSI of the PNAD 10 at the other end of the multi-point to point LSP.

This packet will arrive at the PNAD 10 at the other end of the LSP which will add its VSI's IP address to the ARP header and send the response back to the requesting PNAD 10. If the responding PNAD 10 had previously learned a mapping between the requesting PNAD's IP address and its locally significant label, the response packet can be unicast, otherwise it is sent on the multicast MAC LSP.

The originating PNAD 10 will receive the response ARP packet and recognize its own IP address and then store the mapping between the MAC label in the packet and the destination IP address.

Once the mapping for next hop IP address to MAC label is established, normal IP routing and forwarding can take place between the PNADs 10. For each destination IP address that a PNAD can send to, its forwarding table will contain an entry which contains the exit port, the next hop IP address to which the packet is to be sent and the MAC address/label for that next hop IP address.

The customer could run MPLS across the VPN by forming LDP peers with other PNADs 10 on the logical LAN and using a shim in the packet header to identify MPLS flows.

Some customer networks may require multiple emulated LANs over the carrier network. This could limit the scope of an emulated LAN, control traffic flow, and/or provide hierarchy in customer IP network. A PNAD 10 may have one or more VSIs, each of which may be identified by an IP interface address and a subnet mask or prefix. A separate set of LSPs should be established across the carrier network for each VPN subnet.

Customer routes should not be mixed with carrier routes. It is often the case that customer private networks do not have authorized IP addresses. Since the carrier network is being shared by many customers to provide VPN service, it is possible to have overlapping IP addresses. Therefore, this architectural property of not mixing carrier and customer IP addresses removes this problem.

Topology changes (route flapping) in a customer network may be transparent to the carrier. Routing engines in the LSRs inside the carrier network are not affected by route flaps.

Topology changes in carrier network are transparent to customer network. When routes change in the carrier network, new LSPs are created to route the various VPN traffic according to the new topology without involving PNADs.

CELs in a VPN Subnet, make themselves aware of the other CELs that support the same W VPN Subnet to establish LSPs across the carrier network for the VPN Subnet.

There are several ways to accomplish the distribution of the VPN information such as OSPF opaque LSAs, TCP connections, BGP-4, etc.

With opaque LSAs, the router ID of the CEL together with all the VPN information for that node (list of VPN ID, Interface address and prefix) are put into an opaque LSA and flooded throughout the OSPF AS. This information is delivered, reliably, to every other node via the normal LSA flooding mechanisms.

The TCP connection option allows for a TCP connection to be established between a CEL and all other CELs that support the same set of VPN subnets. The VPN information would be transmitted reliably across the TCP connections to the CEL peers. This option would require that the IP address of each CEL peer be provisioned, however, it provides an option that is independent of the layer 3 routing protocol(s) running in the carrier network.

BGP-4, could also be modified to carry the VPN information. BGP-4 would require a new opaque update type in which it would carry the VPN information.

Figure 2:
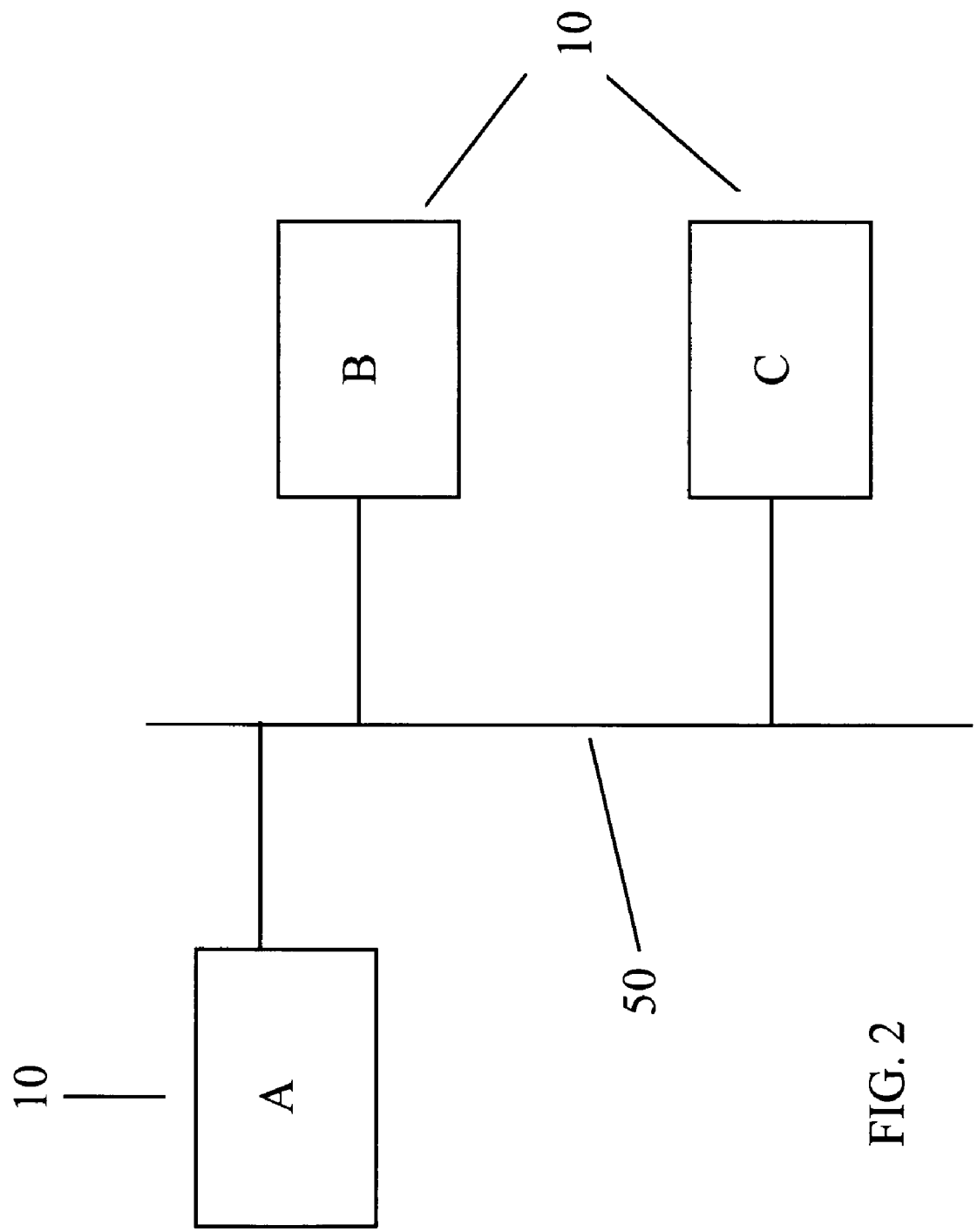
FIG. 2 depicts a block diagram of a logical view of the carrier network as a local area network emulation.

It will thus be seen that the invention efficiently attains the objects set forth above, among those made apparent from the preceding description. In particular, the invention provides a virtual private network and methods of dynamically configuring the same. Those skilled in the art will appreciate that the configuration depicted in FIGS. 1–3 discloses a shared MPLS network which allows the implementation of separate networks over common infrastructure while providing security, scalability and performance to each network.

It will be understood that changes may be made in the above construction and in the foregoing sequences of operation without departing from the scope of the invention. It is accordingly intended that all matter contained in the above description or shown in the accompanying drawings be interpreted as illustrative rather than in a limiting sense.

It is also to be understood that the following claims are intended to cover all of the generic and specific features of the invention as described herein, and all statements of the scope of the invention which, as a matter of language, might be said to fall therebetween.

Having described the invention, what is claimed as new and secured by Letters Patent is:

1. A virtual private network which enables private communications, over a shared Multi-Protocol Label Switching (MPLS) network, between at least two private networks comprising:

a first router coupled to the shared MPLS network and configured to dynamically distribute first router Virtual Private Networks (VPN) information across the shared MPLS network, wherein said first router VPN information includes a VPN identifier and a unique IP address which is assigned to said first router;

a second router coupled to the shared MPLS network and configured to dynamically distribute second router VPN information across the shared MPLS network; wherein said second router VPN information includes a VPN identifier and another unique IP address which is assigned to said second router;

wherein said first and second routers are also configured to establish a plurality of label switched paths therebetween, said label switched paths comprising at least two multipoint-to-point paths and further comprising at least one multi-point to multi-point path; and, wherein said VPN identifier assigned to said first router is the same as said VPN identifier assigned to said second router.

2. The virtual private network according to claim 1 further comprising:
a first private network adaptation device selectively coupleable to said first router; and,
a second private network adaptation device selectively coupleable to said second router;
wherein when said first private network adaptation device is coupled to said first router, and said second private network adaptation device is coupled to said second router said first private network adaptation device may communicate with said second private network adaptation device.

3. The virtual private network according to claim 2 wherein:
said first router includes said first private adaptation device; and,
said second router includes said second private adaptation device.

4. The virtual private network according to claim 2 further comprising at least one core label switched router coupled between said first and second routers and configured to transport communications between said first and second routers.

5. A virtual private network according to claim 1 wherein said first router is configured to employ label stacking to establish at least one of said label switched paths.

6. A virtual private network according to claim 5 wherein said second router is configured to employ label stacking to establish at least one of said label switched paths.

7. A virtual private network according to claim 1 wherein said first router is configured to employ a best hop protocol to establish at least one of said label switched paths.

8. A virtual private network according to claim 7 wherein said second router is configured to employ a best hop protocol to establish at least one of said label switched paths.

9. A virtual private network which enables private communication, over a shared Multi-Protocol Label Switching (MPLS) network, between at least two actual networks comprising:
first router means coupled to the shared MPLS network for dynamically distributing first router means Virtual Private Networks (VPN) information across the shared MPLS network, wherein said first router means VPN information includes a VPN identifier and a unique IP address which is assigned to said first router means;
a second router means coupled to the shared MPLS network for dynamically distributing second router means VPN information across the shared MPLS network; wherein said second router means VPN information includes a VPN identifier and another unique IP address which is assigned to said second router;
wherein said first and second router means are also configured to establish a plurality of label switched paths therebetween, said label switched paths comprising at least two multipoint-to-point paths and further comprising at least one multi-point to multi-point path; and, wherein said VPN identifier assigned to said first router is the same as said VPN identifier assigned to said second router.

10. The virtual private network according to claim 9 further comprising:
first private router means, selectively coupleable to said first router means, for routing communications to a node on a private network attached thereto; and,
second private router means, selectively coupleable to said second router means, for routing communications to a node on a private network attached thereto;
wherein when said first private router means is coupled to said first router, and said second private router means is coupled to said second router said first private router means may communicate with said second private router means.

11. The virtual private network according to claim 10, wherein:
said first router means includes said first private router means; and,
said second router means includes said second private router means.

12. The virtual private network according to claim 10 further comprising at least one core label switched router coupled between said first and second router means and configured to transport communications between said first and second router means.

13. A method of automatically configuring virtual private networks over a shared Multi-Protocol Label Switching (MPLS) network comprising:
creating a link between a private network router and a shared network router, assigning a Virtual Private Networks (VPN) identifier and a unique IP address to said shared network router;
assigning said VPN identifier and another unique IP address to at least one other shared network router; and
creating at least two label switched paths between said shared network router and said at least one other shared network router, said label switched paths comprising at least two multipoint-to-point paths and further comprising at least one multi-point to multi-point path.

14. The method of configuring virtual private networks according to claim 13 wherein:
said at least one other shared network router includes a plurality of shared network routers; and
said creating at least two label switched paths includes creating at least two unidirectional point-to-point label switched paths between said shared network routers.

15. The method of configuring virtual private networks according to claim 14 wherein:
said creating at least two label switched paths further includes creating at least one bi-directional multi-point-to-multi-point label switched path between said shared network routers.

16. The method of configuring virtual private networks according to claim 14 wherein said creating at least two unidirectional point-to-point label switched paths is done using a next best hop route.

* * * * *